United States Patent
Jeyashekar et al.

(10) Patent No.: US 10,662,766 B2
(45) Date of Patent: May 26, 2020

(54) SEALING DEVICE TEST SYSTEMS AND METHODS

(71) Applicant: Southwest Research Institute, San Antonio, TX (US)

(72) Inventors: Nigil Satish Jeyashekar, San Antonio, TX (US); Peter Mark Lee, Fair Oaks Ranch, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 329 days.

(21) Appl. No.: 15/640,015

(22) Filed: Jun. 30, 2017

(65) Prior Publication Data

US 2019/0003301 A1 Jan. 3, 2019

(51) Int. Cl.
| | |
|---|---|
| *E21B 47/12* | (2012.01) |
| *G01N 3/56* | (2006.01) |
| *E21B 47/10* | (2012.01) |
| *G01M 3/02* | (2006.01) |
| *E21B 47/06* | (2012.01) |
| *E21B 41/00* | (2006.01) |
| *E21B 33/12* | (2006.01) |

(52) U.S. Cl.
CPC ........ *E21B 47/124* (2013.01); *E21B 47/1025* (2013.01); *G01M 3/02* (2013.01); *E21B 33/1212* (2013.01); *E21B 41/0042* (2013.01); *E21B 47/06* (2013.01)

(58) Field of Classification Search
CPC ........... G01N 19/02; G01N 3/56; G01M 3/02; E21B 47/124; E21B 47/1025; E21B 47/06; E21B 41/0042; E21B 33/1212
USPC ........... 73/7, 9, 40.5 R, 47, 49.8, 86, 864.34
See application file for complete search history.

(56) References Cited

U.S. PATENT DOCUMENTS

| | | | | |
|---|---|---|---|---|
| 4,404,840 A | * | 9/1983 | Burr ....................... | G01N 3/567 73/7 |
| 6,357,306 B1 | * | 3/2002 | Jaeger .................. | G01N 1/2035 73/863.83 |

FOREIGN PATENT DOCUMENTS

JP 2005091086 * 4/2005

OTHER PUBLICATIONS

L. Haselmaier, Sr., et al: "Flammability and Sensitivity of Materials, The Seal Configuration Tester, A New Approach to the Evaluation of Elastomeric Materials for Oxygen Service"; ASTM International, Symposium Paper Jan. 1995—STP1267STP16423S, pp. 11-22; «http://www.astm.org» (accessed Apr. 19, 2017).

* cited by examiner

*Primary Examiner* — Robert R Raevis
(74) *Attorney, Agent, or Firm* — Grossman, Tucker, Perreault & Pfleger, PLLC (57) ABSTRACT

A dynamic testing system for sealing devices includes a shaft that is reciprocated in a bore through a body. The shaft includes a first seal assembly and a second seal assembly disposed a distance apart on the shaft. When the shaft is inserted into the bore, the first seal assembly and the second seal assembly form a fluid-tight seal between the external surface of the shaft and the internal surface of the bore—this forms a fluid-tight cavity between the seal assemblies. Sealing devices in each of the first seal assembly and the second seal assembly experience chemical attack and mechanical wear. One or more axial force measurement sensors measure the force applied by a prime mover to reciprocate the shaft within the bore. Data acquisition circuitry collects the force information and generates a graphical output that plots friction force against reciprocating cycle count.

25 Claims, 6 Drawing Sheets

SEALING DEVICE TEST SYSTEMS AND METHODS

TECHNICAL FIELD

The present disclosure relates to sealing device test rigs.

BACKGROUND

Sealing devices, such as elastomeric O-rings, lip seals, and similar find extensive use in the vehicular and avionic system hardware in both static and dynamic sealing applications. Static seals are affected by operating conditions (temperature, pressure, etc.) and elastomer/fluid interactions or compatibility. However, in dynamic environments, the relative movement or motion between moving components is an additional factor that causes elastomer wear and, ultimately, seal failure.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

DETAILED DESCRIPTION

The systems and methods described herein create a dynamic, controlled, test environment in which the relatively complex chemical and mechanical interactions that occur between a sealing device and one or more fluids in a dynamic situation where the sealing device is moving with respect to one or more static elements. The test system includes a reciprocating shaft disposed in a bore formed completely through a body. A first seal assembly and a second seal assembly are disposed about the perimeter of the shaft and spaced apart such that a fluid-tight chamber or cavity forms between the first seal assembly and the second seal assembly when the shaft is disposed in the bore. A test fluid circulates through the fluid-tight chamber between the first and second seal assemblies as the shaft reciprocates. The body and chamber are maintained at a desired test temperature or range of test temperatures. One or more force sensing devices, such as a load cell, load sensor, or similar, measures the force required to reciprocate the shaft. The measured reciprocation force may be plotted as a function of reciprocation cycles. The resultant graph provides an expected wear curve for the sealing devices included in the first seal assembly and the second seal assembly. The resultant graph beneficially and advantageously depicts seal device fatigue cycles, seal device wear, and seal device rate of failure as a function of reciprocation cycles.

Shaft seals may be physically coupled to the body and may form a seal about the perimeter of the shaft. The use of a first shaft seal beneficially creates a first variable volume chamber or cavity between the first seal assembly and the first shaft seal. Any fluid leakage past the first seal assembly will flow into the first variable volume chamber where the fluid may be drained from the system. Similarly, the use of a second shaft seal beneficially creates a second variable volume chamber or cavity between the second seal assembly and the second shaft seal. Any fluid leakage past the second seal assembly will flow into the second variable volume chamber where the fluid may be drained from the system. The ability to capture fluid leaking past the first seal assembly and fluid leaking past the second seal assembly beneficially permits the determination of precise leakage rates for the sealing device used in the first seal assembly and the second seal assembly. The sealing device may include one or more devices used to seal between a shaft and a static surface and may include, but is not limited to, sealing devices such as O-rings, lip seals, and similar.

A test apparatus is provided. The test apparatus may include a shaft having a first end and a second end and a first diameter; an axial force measurement device coupleable to the first end of the shaft; a first seal assembly disposed about a perimeter of the shaft; a second seal assembly disposed about the perimeter of the shaft, the second seal assembly spaced apart from the first seal assembly; a body including a bore extending completely through the body, the bore having a second diameter that is larger than the first diameter, the bore to receive the shaft such that a reciprocating fluid-tight cavity forms between the first seal assembly and the second seal assembly; an inlet port fluidly coupled to the fluid-tight cavity; and an outlet port fluidly coupled to the fluid-tight cavity.

A sealing device test method is provided. The method may include reciprocating a shaft having a first diameter in a bore having a second diameter greater than the first diameter through a body, where the shaft includes a first end extending from a first portion of the body and a second end extending from a second portion of the body; and where the shaft includes a first seal assembly disposed about a perimeter of the shaft and a second seal assembly disposed about the perimeter of the shaft, the second seal assembly spaced apart from the first seal assembly to form a reciprocating fluid-tight cavity between the first seal assembly and the second seal assembly within the bore; flowing a test fluid through the reciprocating fluid tight cavity; and measuring an axial displacement force to reciprocate the shaft using a first axial force measurement device coupled to the first end of the shaft.

A sealing device test system is provided. The system may include a sealing device test rig. The sealing device test rig may include: a shaft having a first end and a second end and a first diameter; at least one force sensor operably coupled to the first end of the shaft to measure a reciprocating displacement force applied to the shaft; a first seal assembly disposed about a perimeter of the shaft; a second seal assembly disposed about the perimeter of the shaft, the second seal assembly spaced apart from the first seal assembly; a body including a bore extending completely through the body, the bore having a second diameter that is larger than the first diameter, the bore to receive the shaft such that a reciprocating fluid-tight cavity forms between the first seal assembly and the second seal assembly; an inlet port fluidly coupled to the reciprocating fluid-tight cavity; and an outlet port fluidly coupled to the reciprocating fluid-tight cavity. The system may further include a prime mover operably coupled to the sealing device test rig, the prime mover proving a reciprocating shaft output of from about 1 cycle per minute (cpm) to about 60 cpm; a temperature control system operably coupled to the sealing device test rig to maintain the body at a temperature within a defined temperature range of from about 0° F. to about 400° F.; and data acquisition circuitry communicably coupled to the at least one force sensor, the data acquisition circuitry to measure reciprocating displacement force as a function of reciprocating cycle count.

As used herein the terms "top," "bottom," "lowermost," and "uppermost" when used in relationship to one or more elements are intended to convey a relative rather than absolute physical configuration. Thus, an element described as an "uppermost element" or a "top element" in a device may instead form the "lowermost element" or "bottom element" in the device when the device is inverted. Similarly, an element described as the "lowermost element" or "bottom element" in the device may instead form the "uppermost element" or "top element" in the device when the device is inverted.

As used herein, the term "logically associated" when used in reference to a number of objects, systems, or elements, is intended to convey the existence of a relationship between the objects, systems, or elements such that access to one object, system, or element exposes the remaining objects, systems, or elements having a "logical association" with or to the accessed object, system, or element. An example "logical association" exists between relational databases where access to an element in a first database may provide information and/or data from one or more elements in one or more additional databases, each having an identified relationship to the accessed element. In another example, if "A" is logically associated with "B," accessing "A" will expose or otherwise draw information and/or data from "B," and vice-versa.

As used herein, the terms "first," "second," and other similar ordinals are intended to distinguish a number of similar or identical objects and not to denote a particular or absolute order of the objects. Thus, a "first object" and a "second object" may appear in any order—including an order in which the second object appears before or prior in space or time to the first object. Such configurations should be considered as included within the scope of this disclosure.

Note that in the following discussion specific components are designated using an alphanumeric item designator. For example, a first shaft may be designated 110A and a second shaft may be designated 110B. For ease of discussion and conciseness, when describing a feature common to both items, the alphanumeric designator is omitted. Thus, when such a generic (i.e., non-alphanumeric) designator is used, the described feature should be understood as applicable to all items sharing a common numeric designator. For example, a feature described with respect to "shaft 110" would apply to all shafts 110A-110$n$. On the other hand, a feature described with respect to "shaft 110A" would apply specifically to the shaft designated 110A and not to shafts designated 110B through 110$n$.

Figure 1:
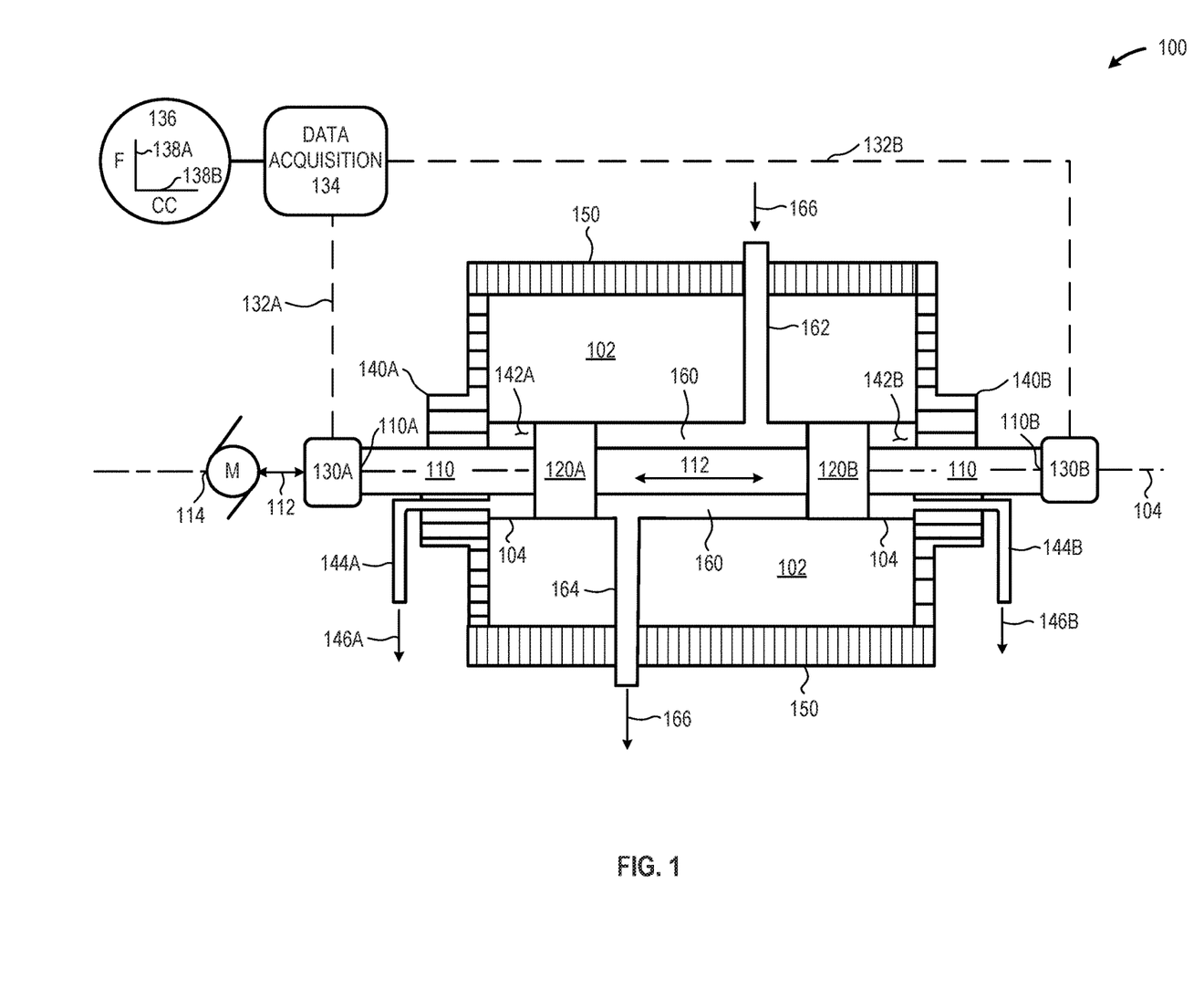
FIG. 1 is a cross-section elevation of an example sealing device test system that includes a body having a bore formed therethrough, a shaft that includes a first seal assembly and a spaced apart second seal assembly that seal against the surface of the bore to form a fluid-tight cavity that receives a fluid flow while reciprocating the shaft, in accordance with at least one embodiment described herein.

FIG. 1 is a cross-section elevation of an example sealing device test system 100 that includes a body 102 having a bore 104 formed therethrough, a shaft 110 that includes a first seal assembly 120A and a spaced apart second seal assembly 120B (collectively, "seal assemblies 120") that seal against the surface of the bore 104 to form a fluid-tight cavity 160 that receives a fluid flow while reciprocating 112 the shaft 110, in accordance with at least one embodiment described herein. Each seal assembly 120 includes at least one sealing device, such as an O-ring, lip seal, or similar. As the shaft 110 reciprocates 112 within the bore 104, each seal assembly is exposed to chemical attack from the fluid 166 passing through the fluid-tight cavity 160 as well as mechanical wear from the friction between the seal assembly 120 and the bore 104. As the sealing device undergoes chemical attack and mechanical wear, the friction between the sealing device 120 and the bore 104 varies, typically decreasing as the seal wears and ultimately approaching zero as the seal assembly fails completely.

The friction between the seal assemblies 120 and the internal surface of bore 104 exerts a resistive force on the shaft 110 as the shaft reciprocates along longitudinal axis 116. Thus, the force input to the shaft 110 provides an indication of the friction between the seal assemblies 120 and the internal surface of the bore 104. The friction between the seal assemblies 120 and the internal surface of the bore 104 provides an indication of the performance and/or degradation of the sealing devices (e.g., O-rings, lip seals, or similar) in the seal assemblies 120.

To measure the reciprocation displacement force 112, a first axial force measurement sensor 130A is operably coupled to the first end 110A of the shaft 110. The first axial force measurement sensor 130A generates a first output signal 132A that includes information and/or data representative of the axial force input provided to the shaft 110 to reciprocate the shaft 110 within the bore 104. Data acquisition circuitry 134 receives the first output signal 132A and, in embodiments, generates a graphical output 136 that includes at least the reciprocation displacement axial force 138A plotted as a function of reciprocation cycles 138B. In some implementations, a second force sensor 130B may be operably coupled to the second end 110B of the shaft 110. The second force sensor 130B generates a second output signal 132B that includes information and/or data representative of the axial force input provided to the shaft 110 to reciprocate the shaft 110 within the bore 104.

A first shaft seal 140A may be disposed about the shaft 110 proximate the first end 110A of the shaft 110. The first shaft seal 140A physically couples to the body 102 and forms a first chamber 142A between the first seal assembly 120A and the first shaft seal 140A. Any fluid leakage through or past the first shaft seal 120A will accumulate in the first chamber 142A. In some implementations, one or more first drains 144A may be allow all or a portion of any fluid in the first chamber 142A to drain 146A from the first chamber 142A. Similarly, a second shaft seal 140B may be disposed about the shaft 110 proximate the second end 110B of the shaft 110. The second shaft seal 140B physically couples to the body 102 and forms a second chamber 142B between the second seal assembly 120B and the second shaft seal 140B. Any fluid leakage through or past the second shaft seal 120B will accumulate in the second chamber 142B. In some implementations, one or more second drains 144B may be allow all or a portion of any fluid in the second chamber 142B to drain 146B from the second chamber 142B.

The body 102 may be fabricated from any number and/or combination of materials. In embodiments, the body 102 may include one or more thermally conductive materials to assist in maintaining the bore 104 at a desired temperature or within a desired temperature range. In implementations, the bore 104 may be formed integral with the body 102. In some implementations, the bore may include a hollow cylindrical sleeve or similar member inserted into or formed with the body 102. The body 102 may include a machined or cast metal or metal alloy body, such as an aluminum or aluminum alloy member having the bore 104 machined therethrough.

The bore 104 may have any diameter and/or length. The bore 104 may have a diameter of: about 0.25 inches (in) or less; about 0.375 in or less; about 0.5 in or less; about 0.625" or less; about 0.75 in or less; about 1 in or less; about 1.25 in or less; about 1.5 in or less; about 2 in or less; or about 3 in or less. The interior surface of the bore 104 may be finished using any currently available or future developed surface finishing techniques, tools, and/or methods. In embodiments, the interior surface of the bore 104 may have a surface finish to provide a desired level of roughness. For example, the bore 104 may be honed to achieve an average surface roughness ($R_a$) of: less than about 10 microinches (μin); less than about 15 μin, less than about 20 μin, less than about 25 μin, less than about 30 μin, or less than about 50 μin. The bore 104 may be finished to achieve a peak height ($R_{pk}$) of: less than about 10 microinches (μin); less than about 15 μin, less than about 20 μin, less than about 25 μin, less than about 30 μin, or less than about 50 μin. The bore 104 may be finished to achieve a valley depth ($R_{vk}$) of: less than about 15 microinches (μin); less than about 25 μin, less than about 35 μin, less than about 50 μin, less than about 65 μin, or less than about 80 μin. The bore 104 may have an average core roughness depth ($R_k$) of: less than about 20 microinches (μin); less than about 30 μin, less than about 35 μin, less than about 40 μin, less than about 45 μin, or less than about 50 μin.

The shaft 110 may include any number and/or combinations of systems or devices capable of supporting the first seal assembly 120A and the second seal assembly 120B in the bore 104 formed in the body 102. The shaft 110 includes a first end 110A that projects from a first portion (e.g., side) of the body 102 and a second end 110B that may also project from a second portion (e.g., side) of the body 102. In some implementations, the first end 110A, the second end 110B, or both the first and the second ends of shaft 110 may include one or more features that enable the operable coupling of a force measurement sensor 130A, 130B to the respective shaft end. In some implementations, the shaft 110 may include a member having a uniform diameter from the first end 110A to the second end 110B. In other embodiments, the shaft 110 may include a member having a non-uniform diameter from the first end 110A to the second end 110B. In some embodiments, the shaft 110 may include one or more sleeves or similar devices to protect the shaft 110 from wear caused by the first seal assembly 120A and/or the second seal assembly 120B. The diameter of the shaft 110 is less than the diameter of the bore 104 in which the shaft reciprocates 112. In embodiments, the longitudinal axis 116 of the shaft 110 is co-linear with the longitudinal axis of the bore 104.

A prime mover 114 having a reciprocating shaft output operably couples to the shaft 110 and causes the reciprocation of the shaft 110 in the bore 104. In some implementations, the prime mover may include a fixed or variable speed electric motor having a rotating shaft output that is operably coupled to a device capable of converting the rotating shaft output to a linearly displaced reciprocating output. The reciprocating output (i.e., the stroke) of the prime mover 114 may have a linear displacement of: about 0.25 inches (in) or less; about 0.5 in or less; about 0.75 in or less; about 1 in or less; about 1.5 in or less; about 2.0 in or less; about 2.5 in or less; about 3 in or less; or about 6 in or less. The reciprocating output of the prime mover 114 may reciprocate at a cycle (e.g., the time required for a point on the shaft to travel from a starting location and return to the starting location) frequency of: about 1 cycle per minute (cpm); about 2 cpm; about 5 cpm; about 8 cpm; about 10 cpm; about 20 cpm; about 30 cpm; about 40 cpm; about 50 cpm; or about 60 cpm.

The first seal assembly 120A and the second seal assembly 120B (collectively, "seal assemblies 120") may include any number, type, and/or combination of sealing devices, carriers, supports, and/or structures. In embodiments, the first seal assembly 120A and the second seal assembly 120B may include one or more identical sealing devices. For example, the first seal assembly 120A and the second seal assembly 120B may include one or more elastomeric O-rings or similar sealing devices. In another example, the first seal assembly 120A and the second seal assembly 120B may include one or more lip seals or similar sealing devices. In yet other implementations, the first seal assembly 120A and the second seal assembly 120B may include combinations of sealing devices, for example an O-ring and a lip seal. The sealing device test system 100 may be used to test the compatibility of various seal materials and/or constructions with various fluids 166 such as hydrocarbons, refrigerants, glycol solutions, greases, synthetic lubricants, organic materials, or combinations thereof. Thus, the sealing devices included in the first seal assembly 120A and the second seal assembly 120B may be selected based, at least in part, on the process fluid 166 and/or expected process operating conditions (pressure, temperature, static/dynamic service, etc.). The frictional force generated as the seal assemblies 120 pass along the interior surface of the bore 104 provides an indication of the performance and/or condition of the sealing device(s) within each of the seal assemblies 120.

The seal assemblies 120 form a fluid-tight seal between the shaft 110 and the interior surface of the bore 104. The first seal assembly 120A is disposed about the perimeter of the shaft 110 and the second seal assembly 120B is disposed about the perimeter of the shaft 110 at a distance from the first seal assembly 120A. A fluid-tight cavity 160 is formed by the seal assemblies 120, the shaft 110, and the interior surface of the bore 104. The reciprocation 112 of the seal assemblies 120 within the bore 104 cause the reciprocation 112 of the fluid-tight cavity 160 within the bore 104.

A fluid 166 is introduced to the fluid-tight cavity 160 via one or more fluid inlet connections 162. In embodiments, the one or more fluid inlet connections 162 may extend partially or completely through the body 102. The fluid 166 exits the fluid-tight cavity 160 via one or more fluid outlet connections 164. In embodiments, the one or more fluid outlet connections 162 may extend partially or completely through the body 102. In at least some implementations, a fluid circulator (e.g., a pump—not shown in FIG. 1) may receive at least a portion of the fluid 166 from the one or more fluid outlet connections 164 and may return all or a portion of the received fluid 166 to the one or more fluid inlet connections 162.

In embodiments, the fluid 166 in the fluid-tight cavity 160 may be maintained at a defined constant pressure. The fluid 166 in the fluid-tight cavity 160 is maintained at a pressure of: about 1 pound per square in gauge (psig) or less; about 5 psig or less; about 10 psig or less; about 25 psig or less; about 50 psig or less; about 75 psig or less; about 100 psig or less; about 300 psig or less; about 600 psig or less; or about 900 psig or less. In other embodiments, the fluid 166 in the fluid-tight cavity 160 may be maintained within a defined pressure range. In embodiments, the fluid 166 in the fluid-tight cavity 160 may be maintained at within a pressure range of: from about 1 pound per square inch gauge (psig) to about 900 psig; about 1 psig to about 600 psig; about 1 psig to about 300 psig; or about 1 psig to about 100 psig.

Any fluid 166 that leaks or otherwise passes through or around the first seal assembly 120A will accumulate in a first chamber 142A between the first seal assembly 120A and the first shaft seal 140A. Any fluid accumulating in the first chamber 142A may be drained 146A via a first chamber drain connection 144A. Any fluid 166 that leaks or otherwise passes through or around the second seal assembly 120B will accumulate in a second chamber 142B between the second seal assembly 120B and the second shaft seal 140B. Any fluid accumulating in the second chamber 142B may be drained 146B via a second chamber drain connection 144B. Advantageously, the ability to detect, collect, and quantify the leakage past the seal assemblies 120 provides additional data on seal performance and/or durability.

The first axial force measurement sensor 130A and the second axial force measurement sensor 130B (collectively, "axial force measurement sensors 130") may be operably coupled to respective ends 110A and 110B of shaft 110 to measure the force provided by the prime mover 114 along the longitudinal axis 116 of shaft 110. In embodiments, only the first axial force measurement sensor 130A may be coupled to the first end 110A of shaft 110. In embodiments, only the second axial force measurement sensor 130B may be coupled to the second end 110B of shaft 110. In embodiments, the first axial force measurement sensor 130A may be coupled to the first end 110A of shaft 110 and the second axial force measurement sensor 130B may be coupled to the second end 110B of shaft 110. In some implementations, the shaft 110 may incorporate or include one or more mounting fixtures or mounting features to accept the physical and/or operable coupling of the axial force measurement sensors 130.

The axial force measurement sensors 130 measure the force applied along the longitudinal axis 116 of the shaft 110 by the prime mover 114. The axial force applied by the prime mover 114 provides an indication of the friction force present between the seal assemblies 120 and the interior surface of the bore 104. The first axial force measurement sensor 130A generates a first output signal 132A that includes information and/or data indicative of the axial force supplied to the shaft 110 by the prime mover 114. The second axial force measurement sensor 130A generates a second output signal 132B that includes information and/or data indicative of the axial force supplied to the shaft 110 by the prime mover 114. The first output signal 132A and/or the second output signal 132B may be provided to data acquisition circuitry 134.

The data acquisition circuitry 134 receives at least the first output signal 132A from the first axial force measurement sensor 130A and may also receive the second output signal 132B from the second axial force measurement sensor 130B. The data acquisition circuitry 134 may be disposed in whole or in part within one or more other circuits, processors, controllers, or similar logical structures. For example, the data acquisition circuitry 134 may be disposed in whole or in part within one or more physical or virtual microprocessors disposed within a laptop computer, tablet computer, desktop computer, mainframe computer, or server/cloud based computer. The data acquisition circuitry 134 may be disposed in whole or in part within a dedicated data acquisition system. In embodiments, in addition to the force information and/or data received from the axial force measurement sensors 130, the data acquisition circuitry 134 may receive information and/or data indicative of a reciprocation cycle count. Such reciprocation cycle count information may be received, for example, from the prime mover 114 or from one or more motion or displacement sensors operably coupled to the shaft 110.

In embodiments, the data acquisition circuitry 134 may generate one or more multi-dimensional outputs that include information and/or data representative of the axial force supplied by the prime mover 114 to the shaft 110. In some embodiments, the data acquisition circuitry 134 may generate a two-dimensional output 136 depicting the axial force 138A supplied by the prime mover 114 to the shaft 110 as a function of the reciprocation cycle count 138B. Plotting the axial force 138A as a function of reciprocation cycle count 138B beneficially and advantageously permits a detailed failure analysis for the sealing device(s) disposed in seal assemblies 120A and 120B when such sealing devices are used in a dynamic environment where both chemical attack and movement (and consequently, mechanical wear) play a role in the ultimate failure of the sealing device(s).

In embodiments, the sealing device test system 100 may include a first shaft seal 140A and a second shaft seal 140B (collectively, "shaft seals 140"). The first shaft seal 140A is disposed about the perimeter of the shaft 110 and may be physically coupled to the first portion of the body 102 from which the shaft 110 extends or protrudes. The first shaft seal 140A minimizes or prevents fluid leakage from around the shaft 110 where the shaft enters/exits the bore 104 formed in the body 102. The second shaft seal 140B is disposed about the perimeter of the shaft 110 and may be physically coupled to the second portion of the body 102 from which the shaft 110 extends or protrudes. The second shaft seal 140B minimizes or prevents fluid leakage from around the shaft 110 where the shaft enters/exits the bore 104 formed in the body 102.

The shaft seals 140 may include any number and/or combination of sealing devices disposed on or about the perimeter of the shaft 110. The sealing devices may include, but are not limited to: O-rings, packing, chevron packing, lip seals, or combinations thereof. In at least some implementations, the shaft seals 140 may include one or more sealing devices that are inert to (i.e., chemically unaffected by) the fluid 166.

One or more temperature control systems 150 may be disposed partially or completely about the body 102. The temperature control system 150 maintains the body at a desired temperature or within a desired temperature range.

In some implementations, the temperature control system 150 may add heat to the sealing device test system 100 to raise the temperature of the system 100 above ambient temperature. In other implementations, the temperature control system 150 may remove heat from the sealing device test system 100 to remove heat from the system. The one or more temperature control systems 150 may include any number and/or combination of systems and/or devices capable of adding thermal energy (i.e., heat) to the sealing device test system 100, removing thermal energy from the sealing device test system 100, or any combination thereof.

In embodiments, the body 102 may be maintained at a defined constant temperature using the one or more temperature control systems. In such embodiments, the one or more temperature control systems 150 may maintain the body 102 at a temperature of: about 70° F. or less; about 100° F. or less; about 125° F. or less; about 150° F. or less; about 200° F. or less; about 250° F. or less; about 300° F. or less; about 350° F. or less; about 400° F. or less. In embodiments, the body 102 may be maintained at a constant temperature. In such embodiments, the body 102 may be maintained at a temperature of: about 70° F. or less; about 100° F. or less; about 125° F. or less; about 150° F. or less; about 200° F. or less; about 250° F. or less; about 300° F. or less; about 350° F. or less; about 400° F. or less. In embodiments, the temperature of the body 102 may be varied to simulate the effect of different operating conditions on the sealing device(s) and/or seal assemblies 120.

Figure 2:
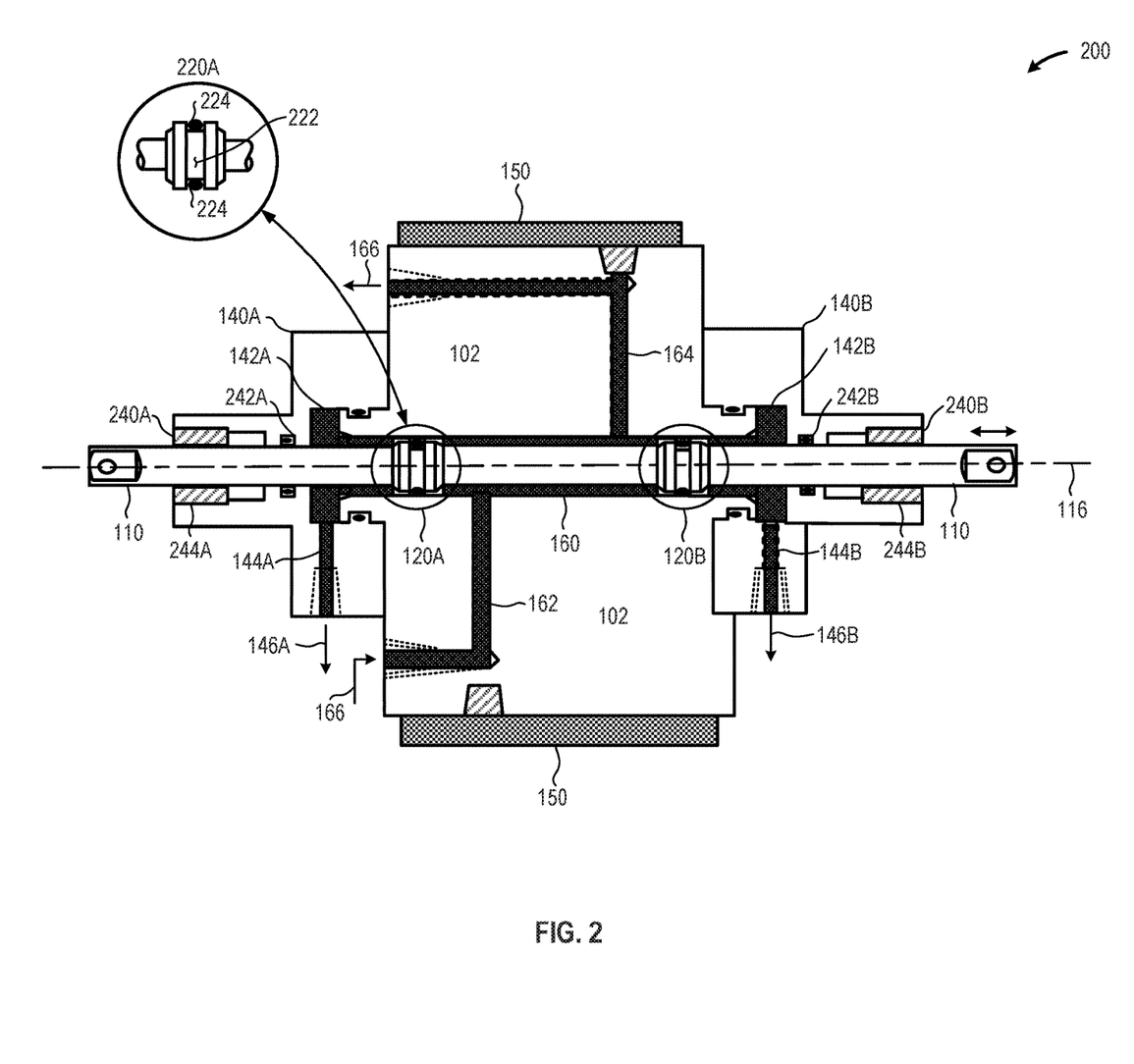
FIG. 2 is a cross-section elevation an example sealing device test system in which the seal assemblies each include an O-ring holder and a sealing device that includes at least one O-ring to seal the shaft against an internal surface of the bore and in which each of the shaft seals include an O-ring seal against the external perimeter of the shaft and a packed stuffing box that seals against the external perimeter of the shaft, in accordance with at least one embodiment described herein.

FIG. 2 is a cross-section elevation an example sealing device test system 200 in which the seal assemblies 120 each include an O-ring holder 222 and a sealing device that includes at least one O-ring 224 to seal the shaft 110 against an internal surface of the bore 104 and in which each of the shaft seals 140 include an O-ring seal 242A, 242B against the external perimeter of the shaft 110 and a packed 240A, 240B stuffing box 244A, 244B that seals against the external perimeter of the shaft 110, in accordance with at least one embodiment described herein.

In embodiments, the seal assemblies 120 may include an O-ring holder 222. The O-ring holder 222 may be formed integral with the shaft 110. In other embodiments, the O-ring holder 222 may be a separate member that is coupled to the shaft 110 such that a fluid-tight joint occurs between the external perimeter of the shaft 110 and the O-ring holder 222. The O-ring holder 222 may include a metallic or a non-metallic member. In some implementations, the O-ring holder 222 may be fabricated from a material having a hardness that is less than the hardness of the interior surface of the bore 104. Such may beneficially limit or even prevent damage to the internal surface of the bore 104 in the event of O-ring failure.

The seal assemblies 120 also include one or more O-rings 222 as a sealing device against the internal surface of the bore 104. In embodiments, an elastomeric O-ring 224 may be disposed in a groove or similar surface feature about the perimeter of the O-ring holder 222. The O-ring 224 may include an elastomeric member produced via extrusion, injection molding, pressure molding, or transfer molding. The O-ring 244 may have any cross-section, such as circular, X-shaped (X-ring); square, and the like.

As depicted in FIG. 2, the shaft seals 140 may include a packed shaft seal 240A, 240B (collectively, "packed shaft seals 240") and an O-ring shaft seal 242A, 242B (collectively, "O-ring shaft seals 242"). The O-ring shaft seals 242 prevent fluid leakage from the first chamber 142A and/or the second chamber 142B from escaping along the shaft 110. The packed shaft seals 240 provide an additional layer of protection against fluid leakage from the first chamber 142A and/or the second chamber 142B from escaping along the shaft 110.

Figure 3:
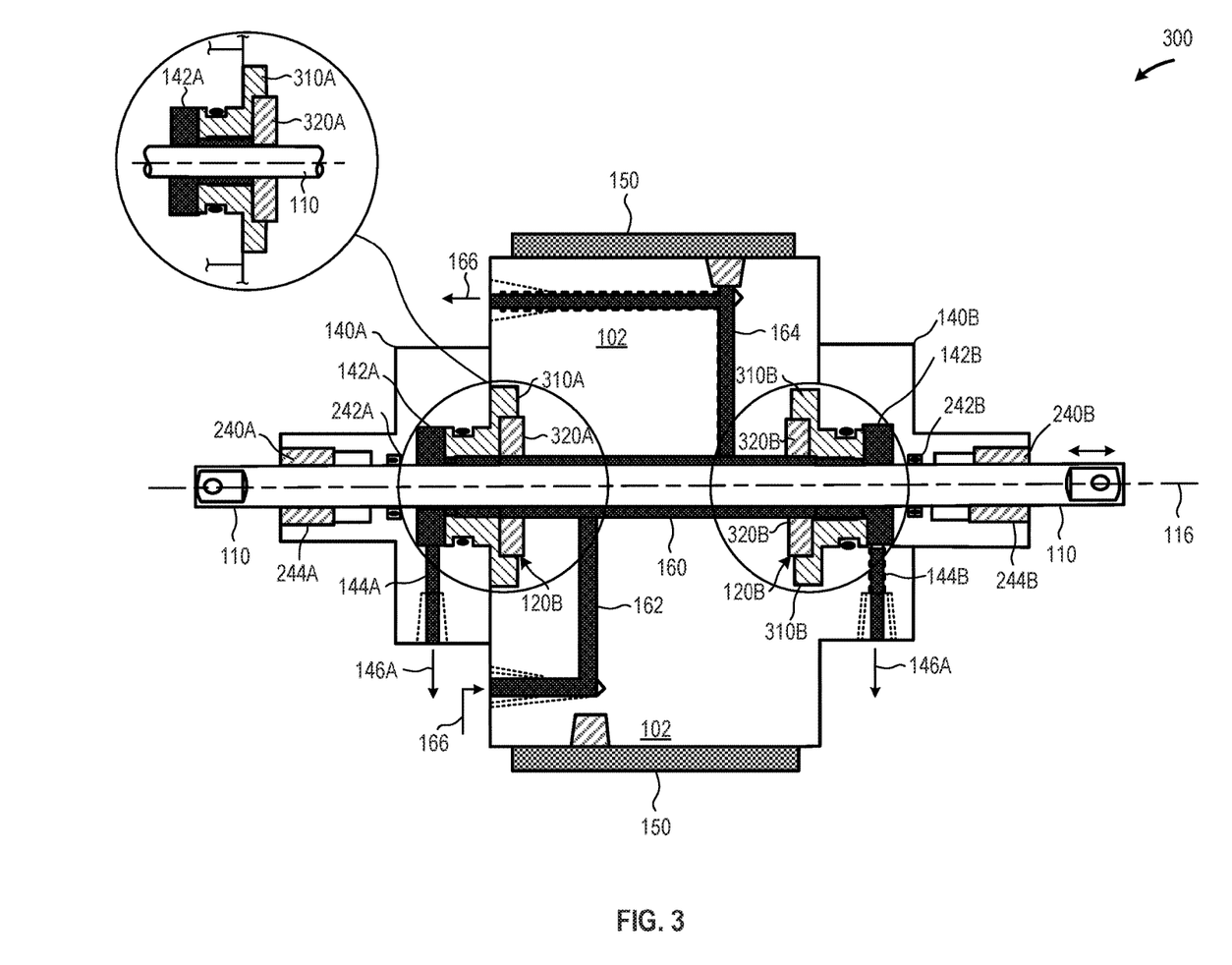
FIG. 3 is a cross-section elevation an example sealing device test system in which the seal assemblies each include a lip seal holder and a sealing device that includes at least one lip seal to seal the shaft against an internal surface of the bore and in which each of the shaft seals include an O-ring seal against the external perimeter of the shaft and a packed stuffing box that seals against the external perimeter of the shaft, in accordance with at least one embodiment described herein.

FIG. 3 is a cross-section elevation an example sealing device test system 300 in which the seal assemblies 120 each include a lip seal holder 310A, 310B and a sealing device that includes at least one lip seal 320A, 320B to seal the shaft 110 against an internal surface of the bore 104 and in which each of the shaft seals 140 include an O-ring seal 242A, 242B against the external perimeter of the shaft 110 and a packed 240A, 240B stuffing box 244A, 244B that seals against the external perimeter of the shaft 110, in accordance with at least one embodiment described herein.

In embodiments, the seal assemblies 120 may include lip seal holder 310. The lip seal holder 310 may, at times, be formed integral with the body 102. In other embodiments, the lip seal holder 310 may be a separate member that is coupled to the body 102 such that a fluid-tight joint occurs between the body 102 and the lip seal holder 310. The lip seal holder 310 may include a metallic or a non-metallic member. The sealing devices within the seal assemblies 120 include one or more lip seals 320A, 320B (collectively, "lip seals 320"). The lip seals 320 form a seal against the external surface of the shaft 110 and against the lip seal holder 310. The lip seals 320 may include any current or future developed sealing device.

Figure 4:
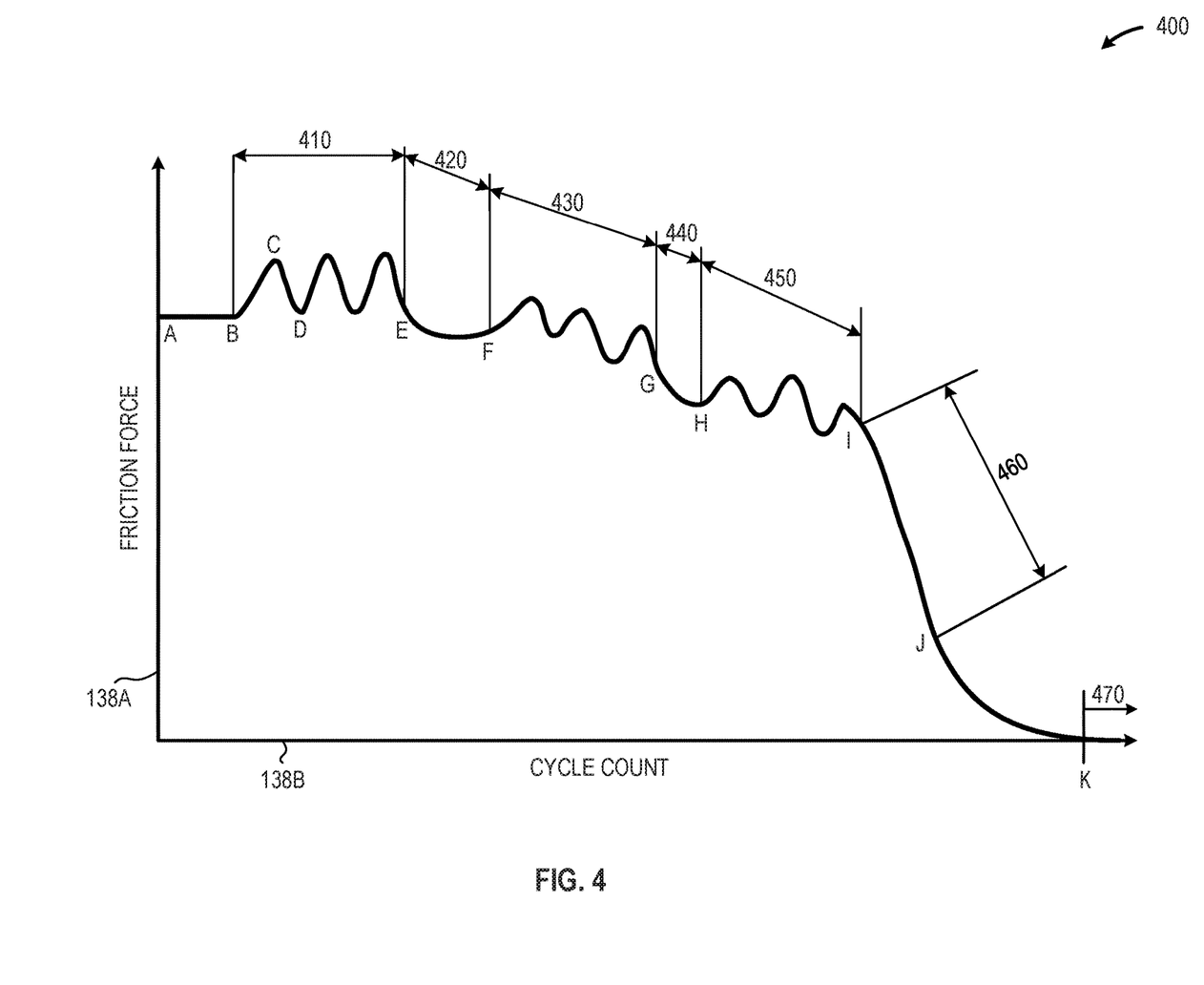
FIG. 4 is a hypothetical example plot 400 of illustrative test run output generated by a data acquisition system, in accordance with at least one embodiment described herein.

FIG. 4 is a hypothetical example plot 400 of illustrative test run output generated by a data acquisition system 134, in accordance with at least one embodiment described herein. FIG. 4 depicts a plot of friction force 138A against reciprocation cycle count 138B. In embodiments, the friction force 138A may be determined based, at least in part, on the power consumption of the prime mover 114 as the shaft 110 is reciprocated. In embodiments, the friction force 138A may be determined using the first axial force measurement sensor 130A and/or the second axial force measurement sensor 130B. As depicted in FIG. 4, the first seal assembly 120A and the second seal assembly 120B each include a single elastomer O-ring 224 disposed about a respective O-ring holder 222.

As depicted in FIG. 4, the initial friction value begins at point "A" and remains relatively constant through a number of cycles to point "B." The fluctuating friction values between points "B" and "E" represent the first elastomer fatigue cycle 410. Within the first elastomer fatigue cycle 410, the friction increases (to point "C") as the fluid 166 causes the O-ring 224 to swell and the friction decreases (to point "D") as a result of heat buildup within the O-ring 224 as the shaft 110 reciprocates within the bore 104. The first elastomer fatigue cycle 410 concludes at point "E."

The relatively steady decrease in friction between points "E" and "F" represent the first elastomer wear cycle 420. Within the first elastomer wear cycle 420, thermal effects cause a gradual decrease in the friction between the O-rings 224 and the internal wall of the bore 104.

The fluctuating friction values between points "F" and "G" represent the second elastomer fatigue cycle 430. Within the second elastomer fatigue cycle 430, the friction increases as the fluid 166 causes the O-ring 224 to swell and the friction decreases as a result of heat buildup within the O-ring 224 as the shaft 110 reciprocates within the bore 104. The second elastomer fatigue cycle 430 concludes at point "G."

The relatively steady decrease in friction between points "G" and "H" represent the second elastomer wear cycle 440. Within the second elastomer wear cycle 440, thermal effects again cause a gradual decrease in the friction between the O-rings 224 and the internal wall of the bore 104.

The fluctuating friction values between points "H" and "I" represent the third elastomer fatigue cycle 450. Within the third elastomer fatigue cycle 450, the friction increases as the fluid 166 causes the O-ring 224 to swell and the friction decreases as a result of heat buildup within the O-ring 224 as the shaft 110 reciprocates within the bore 104. The third elastomer fatigue cycle 450 concludes at point "I."

The steep decrease in friction between points "I" and "J" represent the sudden breakdown of the elastomer O-ring 224 and provides an indication of the rate of failure 460 of the O-ring 224. A steeply sloped rate of failure 460 indicates a relatively sudden breakdown of the elastomer forming the O-ring 224 while a more gently sloped rate of failure 460 indicates a more gradual breakdown of the elastomer forming the O-ring 224. The near zero friction at point "K" represents the ultimate failure of the elastomer forming the O-ring 224.

Figure 5:
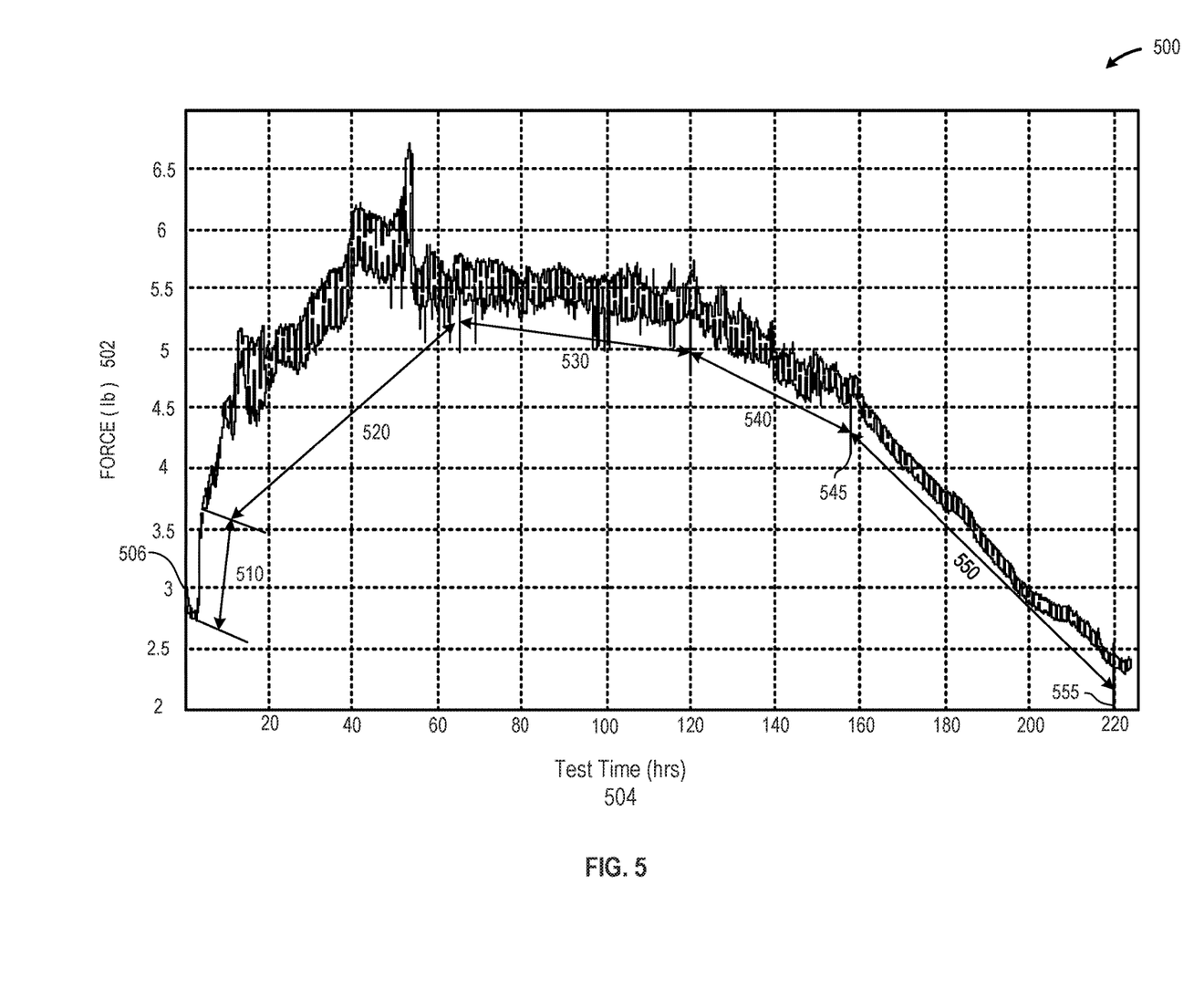
FIG. 5 is an example plot 500 of illustrative test run output generated by a data acquisition system, in accordance with at least one embodiment described herein.

FIG. 5 is an example plot 500 of illustrative test run output generated by a data acquisition system 134, in accordance with at least one embodiment described herein. FIG. 5 depicts a plot of friction force 502 against elapsed test time 504. In embodiments, the friction force 502 may be determined based, at least in part, on the power consumption of the prime mover 114 as the shaft 110 is reciprocated. In embodiments, the friction force 502 may be determined using the first axial force measurement sensor 130A and/or the second axial force measurement sensor 130B. The system generating the test results depicted in FIG. 5 includes a first seal assembly 120A and a second seal assembly 120B each of which includes a single elastomer O-ring 224 disposed about a respective O-ring holder 222.

As depicted in FIG. 5, the initial friction force begins at 506 and initially decreases before beginning to increase at a point approximately three hours into the test. The increase in friction values that occurs approximately 3 hours into the test defines a first region 510 and may be attributable to swelling of the elastomers forming the O-ring 224.

The friction force 502 steadily increases in an oscillatory manner within a second region 520 that extends from approximately 3 hours into the test until about 65 hours into the test. The oscillations and steady increase in friction force 502 that occurs within the second region 520 may be attributable to swell/shrink cycling of the elastomers forming the O-ring 224.

The friction force 502 oscillates in a relatively steady manner within a third region 530 that extends from approximately 65 hours into the test until about 120 hours into the test. The oscillations and steady friction force 502 that occurs within the third region 530 identify a first elastomer wear region. Within the first elastomer wear region 530, the friction force 502 between the O-ring 224 and the test chamber wall remains relatively constant as the shaft 110 reciprocates within the bore 104.

The friction force 502 oscillates in a steadily decreasing manner within a fourth region 540 that extends from approximately 120 hours into the test until about 155 hours into the test. The reduction in oscillatory displacement indicates a steady wear on the O-ring 224 as the shaft 110 reciprocates within the bore 104. The damped oscillations and steady reduction friction force 502 that occurs within the fourth region 540 identify a second elastomer wear region. At the conclusion 545 of the fourth region 540 (i.e., at about the 155 hour mark), the friction force oscillations abruptly cease. The cessation of friction force oscillations after 545 are indicative of an initial failure of the O-ring 224.

The friction force 502 then decreases in an accelerating manner that defines the fifth region that extends from approximately 155 hours into the test to approximate 220 hours into the test until the O-ring 224 ultimately fails at 555. The damped oscillations and steady reduction friction force 502 that occurs within the fourth region 540 are indicative of an elastomer failure region.

Figure 6:
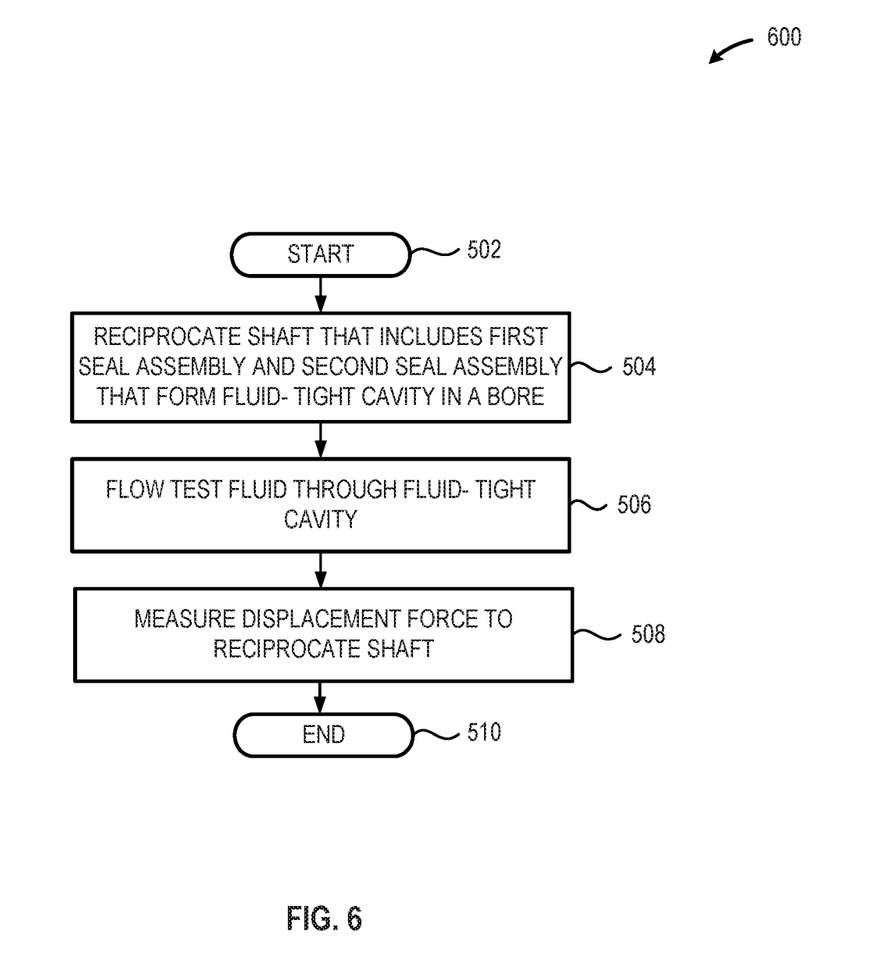
FIG. 6 is a high-level logic flow diagram of an illustrative method of dynamically testing sealing devices using axial force measurement sensors coupled to a reciprocating shaft disposed in a bore to measure the change in force required to reciprocate the shaft as a function of reciprocation cycles, in accordance with at least one embodiment described herein.

FIG. 6 is a high-level logic flow diagram of an illustrative method 600 of dynamically testing sealing devices using axial force measurement sensors 130 coupled to a reciprocating shaft 110 disposed in a bore 104 to measure the change in force required to reciprocate the shaft as a function of reciprocation cycles, in accordance with at least one embodiment described herein. The method 600 beneficially permits the testing of sealing devices, such as elastomeric O-rings, in a dynamic situation and in the presence of the actual process fluids to which the O-ring will be exposed when placed in service. The method 600 advantageously detects performance changes based not only on chemical attack of the elastomer forming the O-ring, but also the mechanical/physical wear that may be expected to occur when the O-ring is placed into service. The ability to test the susceptibility of an O-ring both chemical attack and physical wear simultaneously represents a significant improvement over prior test methods that could not perform such simultaneous testing.

A first seal assembly 120A and a second seal assembly 120B are disposed a distance apart on the shaft. The first seal assembly 120A and the second seal assembly 120B seal against the internal wall of the bore 104 within a body 102, forming a fluid-tight cavity between the first seal assembly 120A and the second seal assembly 120B. The method 600 commences at 502.

At 604, the shaft 110 including the first seal assembly 120A and the second seal assembly 120B is reciprocated along a longitudinal axis extending through a bore 104 in a body 102. The reciprocation of the shaft causes the first seal assembly 120A and the second seal assembly 120B along with the fluid tight chamber 160 to reciprocate/oscillate within the bore 104. The first seal assembly 120A and the second seal assembly 120B may include one or more sealing devices, such as one or more O-rings, one or more lip seals, or combinations of sealing devices.

The shaft 110 may complete one or more reciprocation cycles per minute. In embodiments, the number of reciprocation cycles per minute (cpm) may range from about 1 cpm to about 60 cpm. The reciprocation cycle may displace the shaft 110 through an axial or linear displacement along the longitudinal axis of the shaft 110. The axial displacement of the shaft 110 for each reciprocation cycle may range from less than 1 inch to about 6 inches. In embodiments, the temperature of the bore 104 may be maintained at any desired temperature or within any desired temperature range. In embodiments, the desired temperature may be based, at least in part, on the expected operating conditions to which the O-ring will be exposed. Such temperatures may range, for example, from about 70° F. to about 500° F.

At 606, the fluid-tight cavity 160 receives a flow of test fluid 166 via one or more fluid inlet connections 162 and one or more fluid outlet connections 164. The test fluid 166 may include one or more compounds or components. In embodiments, the test fluid 166 may include entrained gases or suspended/dissolved solids. In embodiments, the test fluid 166 may be circulated through the fluid-tight cavity using one or more fluid recirculators (e.g., pumps). In embodiments, the fluid 166 in the fluid-tight cavity 160 may be maintained at a defined pressure between 1 pound per square inch gauge (psig) and 500 psig. For example, the fluid 166 in the fluid tight cavity may be maintained at a pressure of 50 psig. In embodiments, the fluid 166 in the fluid-tight cavity 160 may be maintained within a defined pressure range between about 1 pound per square inch gauge (psig) to about 500 psig. For example, the fluid 166 in the fluid-tight cavity 160 may be maintained within a pressure range of from about 1 psig to about 100 psig.

The test fluid 166 may be selected, at least in part, on the expected operating fluid(s) to which the O-ring will be exposed. The ability to test the durability and longevity of an O-ring seal in a dynamic environment in which temperature, pressure, fluid composition, and mechanical wear are individually adjustable provides a significant advantage over static test rigs which do not consider mechanical wear and other test rigs where process variables such as pressure and temperature are not individually controllable.

At 608, the force required to displace the shaft 110, the first seal assembly 120A and the second seal assembly 120B through at least one complete reciprocation cycle is measured using at least the first axial force measurement sensor 130A. In some implementations, the force required to displace the shaft 110, the first seal assembly 120A and the second seal assembly 120B through at least one complete reciprocation cycle may be additionally or alternatively measured using a second axial force measurement sensor 130B. The axial force measured by the axial force measurement sensors 130 is indicative of the frictional forces between the seal assemblies and the internal wall of the bore 104. As the sealing devices in each of the seal assemblies 120 deteriorate with increasing reciprocating cycle count, the friction generally decreases as chemical attack and mechanical wear compromise the sealing device(s) in each of the seal assemblies 120. Thus, measuring the axial force applied to the shaft provides an indication of the condition of the sealing device(s) in each of the seal assemblies 120.

In some implementations, each of the axial force measurement sensors 130 may communicate or otherwise transmit an output signal 132 to the data acquisition circuitry 134. The output signal 132 may include information and/or data indicative of the measured axial force applied by the prime mover 114 to the shaft 110. The output signal(s) 132 may include one or more signals containing or carrying analog information and/or data (e.g., 4-20 milliamp, 1-5 VDC signals) or one or more signals containing or carrying digital information. Other process variables, for example fluid-tight cavity 160 temperature and/or pressure may be measured and communicated to the data acquisition circuitry 134.

In embodiments, the data acquisition circuitry 134 may store, save, or otherwise retain at least a portion of the information and/or data included in the received signal(s) 132. In embodiments, the data acquisition circuitry 134 may generate graphical output that includes a plot of measured friction force 138A (i.e., measured axial input force provided by the prime mover to reciprocate the shaft 110 in the bore 104) as a function of reciprocating cycle count 138B, such as described in detail above with regard to FIG. 4. The method 600 concludes at 610.

While FIG. 6 illustrates various operations per one or more embodiments, it is to be understood that not all the operations depicted in FIG. 6 are necessary for other embodiments. Indeed, it is fully contemplated herein that in other embodiments of the present disclosure, the operations depicted in FIG. 6 and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for dynamically testing sealing devices such as O-rings and lip seals. The system includes a shaft that is reciprocated in a bore through a body. The shaft includes a first seal assembly and a second seal assembly disposed a distance apart on the shaft. When the shaft is inserted into the bore, the first seal assembly and the second seal assembly form a fluid-tight seal between the external surface of the shaft and the internal surface of the bore—this forms a fluid-tight cavity between the seal assemblies. One or more fluids flow through the fluid-tight cavity as the shaft reciprocates at a defined speed (e.g., between 1 cycle per minute and 60 cycles per minute). Sealing devices in each of the first seal assembly and the second seal assembly experience chemical attack (from the fluid) and mechanical wear (from friction with the internal surface of the bore). One or more axial force measurement sensors measure the force applied by a prime mover to reciprocate the shaft (and seal assemblies) within the bore. Data acquisition circuitry collects the force information and generates a graphical output that plots friction force (i.e., force applied to reciprocate the shaft in the bore) against reciprocating cycle count. The resultant plot can be analyzed to identify, using an elastomeric O-ring sealing device as an example, elastomer fatigue cycles, elastomer wear cycles, a rate of O-ring failure, and an ultimate O-ring failure point. The system permits dynamic testing while individually varying process variables such as fluid composition, operating temperature, and operating pressure.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for dynamically testing sealing devices.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A test apparatus, comprising:
   a shaft having a first end and a second end and a first diameter;
   an axial force measurement device coupled to the first end of the shaft wherein said axial force measurement device measure the force to reciprocate the shaft;
   a first seal assembly under test disposed about a perimeter of the shaft
   a second seal assembly under test disposed about the perimeter of the shaft, the second seal assembly spaced apart from the first seal assembly;
   a body including a bore extending completely through the body, the bore having a second diameter that is larger than the first diameter, the bore to receive the shaft such that a reciprocating fluid-tight cavity forms between the first seal assembly and the second seal assembly;
   an inlet port fluidly coupled to the enclosed chamber; and
   an outlet port fluidly coupled to the enclosed chamber.

2. The test apparatus of claim 1, further comprising:
   a first shaft seal coupled to the body, the first shaft seal to seal about the perimeter of the shaft, the first shaft seal positioned between the first seal assembly and the first end of the shaft, the first shaft seal including a first leakage port to drain leakage through the first seal assembly; and
   a second shaft seal coupled to the body, the second shaft seal to seal about the perimeter of the shaft, the second shaft seal positioned between the second seal assembly and the second end of the shaft, the second shaft seal including a second leakage port to drain leakage through the second seal assembly.

3. The test apparatus of claim 1:
   wherein the first seal assembly comprises an elastomeric O-ring; and wherein the second seal assembly comprises an elastomeric O-ring.

4. The test apparatus of claim 1:
   wherein the first seal assembly comprises a lip seal; and wherein the second seal assembly comprises a lip seal.

5. The test apparatus of claim 1, further comprising:
   a temperature control device coupled to the body to maintain the temperature of the body within a defined temperature range.

6. The test apparatus of claim 1, further comprising:
   a second force measurement device coupleable to the second end of the shaft.

7. The test apparatus of claim 5 wherein the second force measurement device comprises a load cell.

8. The test apparatus of claim 1 wherein the first axial force measurement device comprises a load call.

9. The test apparatus of claim 8, further comprising a data acquisition device operably coupled to the first axial force measurement device, the data acquisition device to generate data representative of a displacement force provided by the prime mover as a function of reciprocating cycle count.

10. The test apparatus of claim 1, further comprising a prime mover having a reciprocating shaft output operably coupled to the shaft such that the chamber is cyclically reciprocated through a displacement distance within the body.

11. A sealing device test method, comprising:
    reciprocating a shaft having a first diameter in a bore having a second diameter greater than the first diameter through a body,
    wherein the shaft includes a first end extending from a first portion of the body and a second end extending from a second portion of the body; and
    wherein the shaft includes a first seal assembly disposed about a perimeter of the shaft and a second seal assembly disposed about the perimeter of the shaft, the second seal assembly spaced apart from the first seal assembly to form a reciprocating fluid-tight cavity between the first seal assembly and the second seal assembly within the bore;
    flowing a test fluid through the reciprocating fluid tight cavity; and
    measuring a displacement force to reciprocate the shaft using a first force measurement device coupled to the first end of the shaft.

12. The method of claim 11, further comprising:
    measuring a displacement force to reciprocate the shaft using a second force measurement device coupled to the second end of the shaft.

13. The method of claim 11 wherein reciprocating, in a bore through a body, a shaft that includes a first seal assembly disposed about a perimeter of the shaft and a second seal disposed about the perimeter of the shaft comprises:
    reciprocating, in the bore through the body, a shaft that includes a first test O-ring seal disposed about a perimeter of the shaft and a second test O-ring seal disposed about the perimeter of the shaft.

14. The method of claim 11 wherein reciprocating, in a bore through a body, a shaft that includes a first seal assembly disposed about a perimeter of the shaft and a second seal disposed about the perimeter of the shaft comprises:

reciprocating, in the bore through the body, a shaft that includes a first test lip seal disposed about a perimeter of the shaft and a second test lip seal disposed about the perimeter of the shaft.

15. The method of claim 11, further comprising:
controlling a temperature of the body to maintain the body at a temperature within a defined temperature range.

16. The method of claim 11, further comprising:
controlling a temperature of the body to maintain the body at a temperature within a defined temperature range of from about 0° F. to about 400° F.

17. The method of claim 11, further comprising:
measuring fluid leakage through the first seal assembly via a first bypass fluid port in a first shaft seal disposed proximate the first portion of the body and sealed about the perimeter of the shaft; and
measuring fluid leakage through the second seal assembly via a second bypass fluid port in a second shaft seal disposed proximate the second portion of the body and sealed about the perimeter of the shaft.

18. The method of claim 11 wherein oscillating a shaft in a bore through a body comprises:
reciprocating the shaft in the bore at a rate of from about 1 cycle per minute to about 60 cycles per minute.

19. The method of claim 11, further comprising:
circulating a test fluid through the reciprocating fluid-tight cavity via at least one test fluid circulator.

20. The method of claim 19 wherein the at least one test fluid circulator maintains a pressure of from about 1 pound per square inch gauge (PSIG) to about 100 PSIG in the reciprocating fluid-tight cavity.

21. A sealing device test system, comprising:
a sealing device test rig, including:
a shaft having a first end and a second end and a first diameter;
at least one force sensor operably coupled to the first end of the shaft to measure a reciprocating displacement force applied to the shaft;
a first seal assembly disposed about a perimeter of the shaft
a second seal assembly disposed about the perimeter of the shaft, the second seal assembly spaced apart from the first seal assembly;
a body including a bore extending completely through the body, the bore having a second diameter that is larger than the first diameter, the bore to receive the shaft such that a reciprocating fluid-tight cavity forms between the first seal assembly and the second seal assembly;
an inlet port fluidly coupled to the reciprocating fluid-tight cavity; and
an outlet port fluidly coupled to the reciprocating fluid-tight cavity;
a prime mover operably coupled to the sealing device test rig, the prime mover proving a reciprocating shaft output of from about 1 cycle per minute to about 60 cycles per minute;
a temperature control system operably coupled to the sealing device test rig to maintain the body at a temperature within a defined temperature range of from about 0° F. to about 400° F.; and
data acquisition circuitry communicably coupled to the at least one force sensor, the data acquisition circuitry to measure reciprocating displacement force as a function of reciprocating cycle count.

22. The test system of claim 21:
wherein the first seal assembly comprises a first O-ring seal; and
wherein the second seal assembly comprises a second O-ring seal.

23. The test system of claim 21:
wherein the first seal assembly comprises a first lip seal; and
wherein the second seal assembly comprises a second lip seal.

24. The test system of claim 21, wherein the sealing device test rig further comprises:
a first shaft seal coupled to the body, the first shaft seal to seal about the perimeter of the shaft, the first shaft seal positioned between the first seal assembly and the first end of the shaft, the first shaft seal including a first leakage port to drain leakage through the first seal assembly; and
a second shaft seal coupled to the body, the second shaft seal to seal about the perimeter of the shaft, the second shaft seal positioned between the second seal assembly and the second end of the shaft, the second shaft seal including a second leakage port to drain leakage through the second seal assembly.

25. The test system of claim 21 wherein the data acquisition circuitry further measures fluid leakage through the first seal assembly and fluid leakage through the second seal assembly.

* * * * *